(12) United States Patent
Klahold et al.

(10) Patent No.: US 7,438,359 B2
(45) Date of Patent: Oct. 21, 2008

(54) LONGITUDINAL ADJUSTER FOR A VEHICLE SEAT

(75) Inventors: Wolfgang Klahold, Herne (DE); Gerhard Mitulla, Bochum (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/809,069

(22) Filed: May 31, 2007

(65) Prior Publication Data

US 2007/0236064 A1 Oct. 11, 2007

Related U.S. Application Data

(63) Continuation of application No. PCT/EP2005/012535, filed on Nov. 23, 2005.

(30) Foreign Application Priority Data

Dec. 1, 2004 (DE) ............... 10 2004 057 900

(51) Int. Cl.
B60N 2/12 (2006.01)
B60N 2/02 (2006.01)
(52) U.S. Cl. ................... 297/341; 248/429
(58) Field of Classification Search ........... 297/341; 248/429, 430
See application file for complete search history.

(56) References Cited

U.S. PATENT DOCUMENTS

| 5,348,373 | A | | 9/1994 | Stiennon |
| 5,873,629 | A | | 2/1999 | Schuler |
| 5,944,383 | A | * | 8/1999 | Mathey et al. ............ 297/341 |
| 6,048,030 | A | * | 4/2000 | Kanda et al. ............ 297/341 |
| 6,799,800 | B2 | * | 10/2004 | Klahold et al. .......... 297/341 |
| 7,172,249 | B2 | * | 2/2007 | Rausch et al. ........... 297/341 |
| 2004/0164599 | A1 | | 8/2004 | Klahold et al. |
| 2006/0113829 | A1 | | 6/2006 | Klahold et al. |

FOREIGN PATENT DOCUMENTS

GB 2 113 986 A 8/1983
WO WO 03/062012 A1 7/2003

* cited by examiner

*Primary Examiner*—Sarah B McPartlin
(74) *Attorney, Agent, or Firm*—Womble Carlyle Sandridge & Rice, PLLC

(57) ABSTRACT

A longitudinal adjuster for a vehicle seat includes a displacement sensor (21), which can interact with a seat rail, and a control signal emitter (41), which can be displaced in relation to the displacement sensor (21). The relative movement of the signal emitter (41) in relation to the displacement sensor (21) reproducing, from a starting position, the longitudinal displacement carried out. The control signal emitter (41) is subjected to a control torque, at the latest once the stored longitudinal position of the seat has been reached, and then controls at least one blocking element (73) which interacts with the seat rail by way of a control spring (51). A control bearing (45) is arranged between the control signal emitter (41) and the control spring (51), which guides the control signal emitter (41) and which supports the control spring (51).

20 Claims, 3 Drawing Sheets

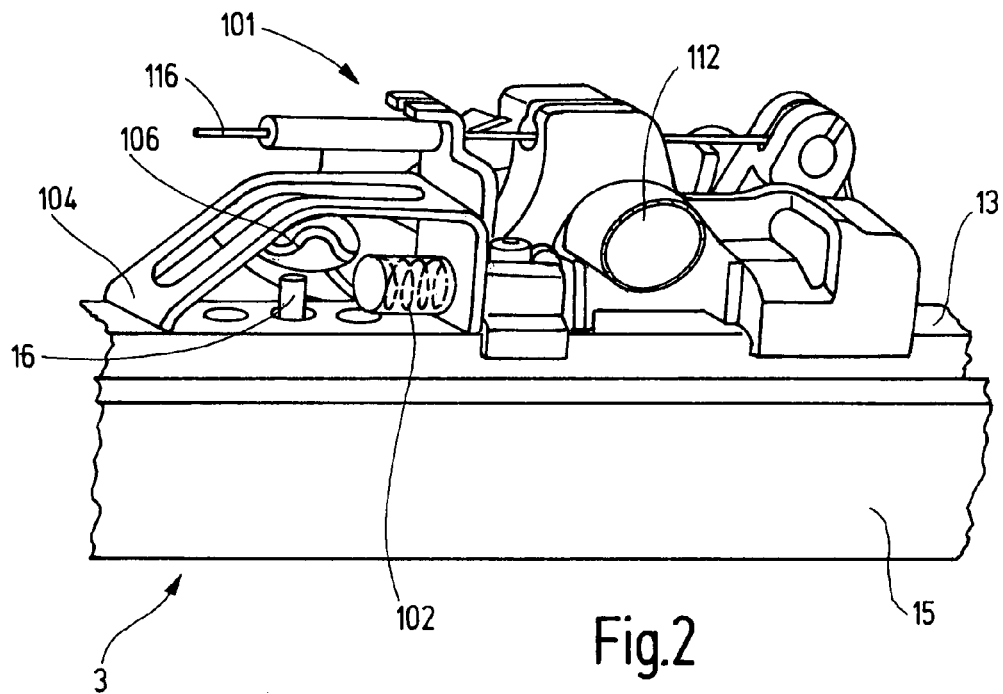
Fig.2
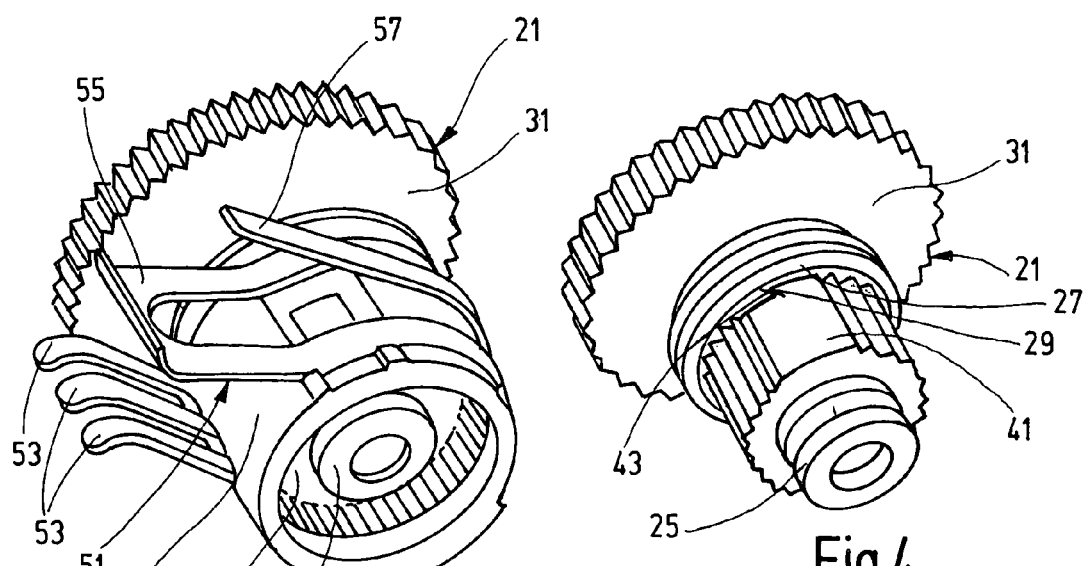
Fig.3
Fig.4
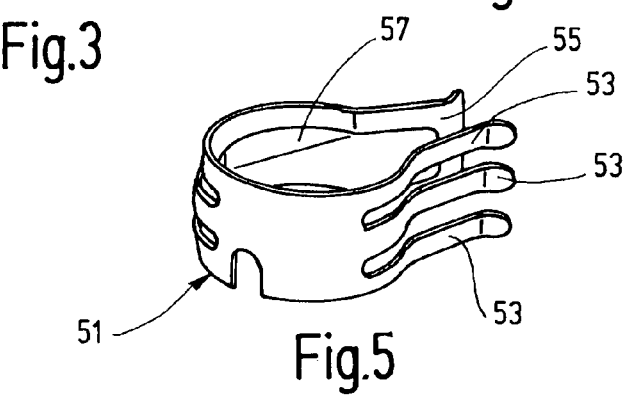
Fig.5

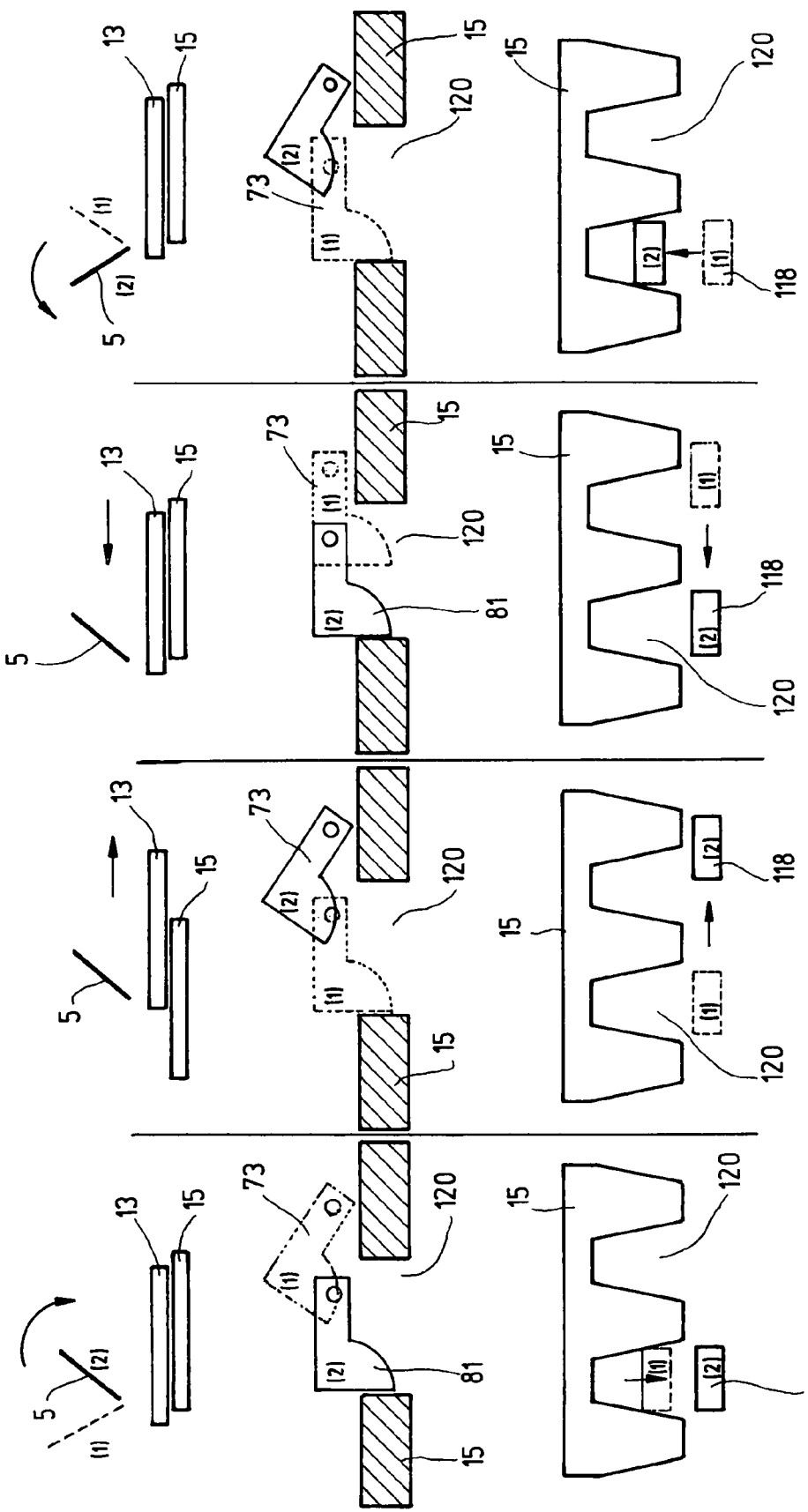

LONGITUDINAL ADJUSTER FOR A VEHICLE SEAT

CROSS-REFERENCE TO RELATED APPLICATIONS

The present application is a continuation of International Application PCT/EP2005/012535, which was filed Nov. 23, 2005. The entire disclosure of International Application PCT/EP2005/012535, which was filed Nov. 23, 2005, is incorporated herein by reference. Foreign priority is claimed to DE 10 2004 057 900.8 filed Dec. 1, 2004.

BACKGROUND OF THE INVENTION

The present invention relates to a longitudinal adjuster for a vehicle seat having a freely pivotable back rest, with the longitudinal adjuster having a first seat rail, a second seat rail in relation to which the first seat rail can be slid in the longitudinal direction, and a memory device that is assigned to the first seat rail, interacts with the second seat rail and stores a set longitudinal seat position which can be left by means of a longitudinal displacement of the vehicle seat when the back rest pivots freely, and resumed when the backrest pivots back, with the memory device having a displacement measuring device that can be operatively associated with the second seat rail and can then rotate about a rotational axis, and a control signal generator that can be moved in relation to the displacement measuring device and whose relative movement with respect to the displacement measuring device from a home position represents the longitudinal displacement which has occurred, and the control signal generator experiences, at the latest when the stored longitudinal seat position is reached, a control torque and then actuates, by means of a control spring, at least one locking element that interacts with the second seat rail.

WO 03/062012 A1 discloses a longitudinal adjuster of the type described immediately above. The memory device is connected through the upper side of the first seat rail to an actuation device. The actuation device is mounted on the first seat rail and actuates the memory device for the purpose of resetting. The control spring is mounted on the control signal generator. The control signal generator includes a longitudinal rib that extends parallel to the rotational axis of the displacement measuring device. The control spring has a corresponding bulge. The rib and corresponding bulge ensure, as a floating bearing, that there is a rotationally fixed connection with the possibility of displacement along the rotational axis of the displacement measuring device. These components are costly to manufacturing because of the specific shaping and the high demands in terms of dimensional accuracy. When the stored longitudinal position of the seat is reached, the actuated locking element pivots out and drops into the second seat rail. A small relative movement of the seat rails is necessary to release and pivot in.

BRIEF SUMMARY OF SOME ASPECTS OF THE INVENTION

An aspect of the present invention is the provision of improvements to a longitudinal adjuster of the type mentioned immediately above, in particular simplifying its manufacture. In accordance with one aspect of the present invention, a longitudinal adjuster that is for a vehicle seat is capable of being responsive to predetermined pivoting of a back rest of the vehicle seat, and the longitudinal adjuster includes a first seat rail, a second seat rail and a memory device. The first and second seat rails are mounted so that the first seat rail can be moved longitudinally relative to the second seat rail. The memory device is mounted for longitudinally moving with the first seat rail relative to the second seat rail. The memory device interacts with the second seat rail for remembering a longitudinal position of the first seat rail with respect to the second seat rail, so that the first seat rail can be longitudinally moved back to the remembered longitudinal position after the first seat rail has been longitudinally moved out of the remembered longitudinal position. The first seat rail having been longitudinally moved out of the remembered longitudinal position is at least partially in response to the predetermined pivoting of the back rest of the vehicle seat. The memory device includes a displacement measuring device that is rotatable about a rotational axis and that can be brought into cooperative interaction with the second seat rail. The memory device also includes a control signal generator mounted for moving relative to the displacement measuring device. The moving of the control signal generator relative to the displacement measuring device corresponding to how far the first seat rail has longitudinally moved relative to the remembered longitudinal position. The control signal generator is operative for experiencing, at the latest when the first seat rail has been longitudinally moved back to the remembered longitudinal position, a control torque, and then actuating, by way of a control spring, at least one locking element so that the locking element makes locking contact against the second seat rail. The memory device also includes a control bearing arranged between the control signal generator and the control spring. The control bearing guides the control signal generator and supports the control spring.

Because a control bearing that guides the control signal generator and supports the control spring is mounted between the control signal generator and the control spring, the bearing function and guiding function are separated from one another. This permits simplified support of the control spring and geometrically simplified manufacture thereof. The quality of the guiding between the control signal generator and control bearing is independent of the position of the control signal generator during its movements. If the control bearing is manufactured from plastic, the cost of manufacturing it are insignificant given the advantages obtained.

The control bearing preferably encloses (e.g., extends around) the control signal generator, for example by virtue of the fact that the control bearing is embodied as a bushing, and is therefore arranged radially outside the control signal generator. The control bearing preferably guides the control signal generator linearly along the rotational axis of the displacement measuring device, that is to say axially, preferably by virtue of the fact that the control signal generator is seated in the control bearing so as to be slidable relative to the control bearing by means of a toothing (e.g., a notch toothing) in a rotationally fixed and axial fashion, i.e. perpendicularly with respect to the toothed profile of the toothing. The control signal generator in turn preferably runs as a spindle nut on a spindle of the displacement measuring device, along its rotational axis (axially) so that the relative movement between the displacement measuring device and control signal generator occurs in a very small space and precise storage of the travel which is covered from the stored (e.g., remembered) longitudinal position of the seat is possible. The axial length of the control bearing is matched to the axial component of the maximum travel covered by the control signal generator.

The control bearing supports the control spring in a defined way, preferably by means of depressions and/or elevations, which are provided on the outside of the control bearing in the preferred arrangement, and are embodied in terms of their dimensions and shapes to match the control spring. Preferably, the control spring substantially surrounds the control bearing, which ensures a firm fit and concentrates the existing prestress of the control spring onto the protruding parts of the control spring. At the same time, the control spring preferably has at least one control tongue which protrudes from the control bearing with its free end which is short compared to the overall length, the prestress thus occurring with a short lever arm.

In the memory device which is used according to the invention, a measuring region, a load region and a control region are separated as far apart from one another as possible so that the forces which are necessary for the locking effect between the seat rails, i.e. the forces which are necessary to stop the movement of the first seat rail, are not absorbed by the means for sensing the travel in a measurement region but rather by a separate, actuated locking element in a load region so that components which are cost effective to manufacture and are made of plastic can be used for the control region and measurement region, while metal components are used for the load region. The control region does not have to be completely integrated into the measurement region but rather can be separated from it, which increases the variety of possible actuations.

The actual locking of the longitudinal adjuster is to be differentiated from the locking elements in the load region of the memory device. The actual locking of the longitudinal adjuster is carried out by means of a separate locking device which is designed to absorb crash forces, and unlocks the longitudinal adjuster when it is triggered directly, and locks the longitudinal adjuster again in the newly set longitudinal position of the seat. This locking device is in principle independent of the memory device, but generally couples indirectly by means of the triggering of the longitudinal adjuster. For example, there can be a coupling for a reset of the memory device.

A control device is preferably provided which resets the memory device when the longitudinal adjuster is directly triggered, in order to permit a new longitudinal position of the seat to be stored (e.g., remembered). The memory device is decoupled without resetting when the backrest pivots freely, so that the set (e.g., remembered) longitudinal position of the seat remains stored and can be found again. The actuation device can be mounted above the memory device on the first seat rail, that is to say in the direct vicinity of the memory device, which simplifies access to the control region and the resetting of the memory device. In this context, the actuation device can at the same time form a component of the unlocking system of the longitudinal adjuster by virtue of the fact that the actuation device supports components which are necessary for unlocking, for example. When pivoting free, the actuation device can then preferably actuate the locking device in order to unlock it.

Because the actuation device is arranged with limited mobility relative to the first seat rail in the longitudinal direction, in particular at the start and at the end of the free pivoting movement, the actuation device, together with the interfaces to the memory device and the locking device, can also move the memory device itself, relative to the first seat rail, when there is a preferred connection of the memory device to the actuation device. As a result, it is possible, for example, for a locking element which is located in a locking fashion bearing against the second seat rail to become detached from the second seat rail.

The actuation device is preferably supported on the first seat rail by means of a spring, with the spring making available both the travel for movement, for example from a home position, and ensuring that there is a restoring force into the home position. The force for moving the actuation device preferably engages on the actuation device by means of a Bowden cable, with this force being preferably applied by means of the freely pivoting backrest as an attractive (e.g., tensile) force in the Bowden cable.

The invention is preferably used for vehicle seats of two-door motor vehicles with freely pivotable backrests, but it can also be employed in other vehicle seats.

Other aspects and advantages of the present invention will become apparent from the following.

BRIEF DESCRIPTION OF THE DRAWINGS

The invention will be explained in more detail below with reference to an exemplary embodiment which is illustrated in the drawings, and in which:

FIG. 2 is a perspective partial view of the exemplary embodiment, with the direction of travel pointing to the right.

FIG. 3 is a perspective view of the displacement measuring device, control signal generator, control bearing and control spring.

FIG. 4 is a perspective view of the displacement measuring device and control signal generator.

FIG. 5 is a perspective view of the control spring.

FIG. 7 is a schematic illustration of the inclination of the backrest, the relative position of the seat rails, the positioning lever that interacts with the horizontally sectioned, second seat rail, and the latching plate that interacts with the vertically sectioned, second seat rail, in each case at the start of the free pivoting movement and in the remembered position, with (1) indicating the position before the pivoting of the backrest, and (2) indicating the position with the backrest pivoted forward and the actuation device pivoted back.

FIG. 8 is a schematic illustration corresponding to FIG. 7, in each case as the vehicle seat is slid forward, where (1) indicates the position before the sliding movement and (2) indicates the position with the vehicle seat slid forward.

FIG. 9 is a schematic illustration corresponding to FIG. 7, in each case as the vehicle seat is slid back, where (1) indicates the position before the locking of the memory device, and (2) indicates the position with the memory device locked.

FIG. 10 is a schematic illustration corresponding to FIG. 7, in each case at the end of the free pivoting movement, where (1) indicates the position before the pivoting of the backrest and (2) indicates the position with the backrest pivoted back and the actuation device slid forward.

DETAILED DESCRIPTION OF EXEMPLARY EMBODIMENT

Figure 6:
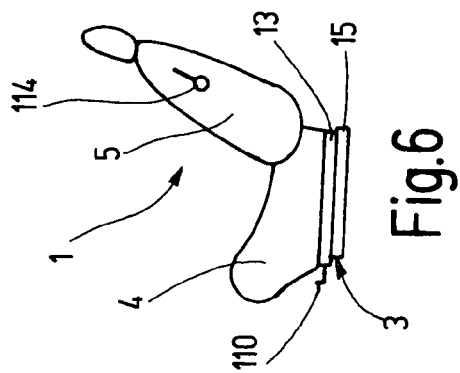
FIG. 6 is a schematic illustration of a vehicle seat.
Figure 1:
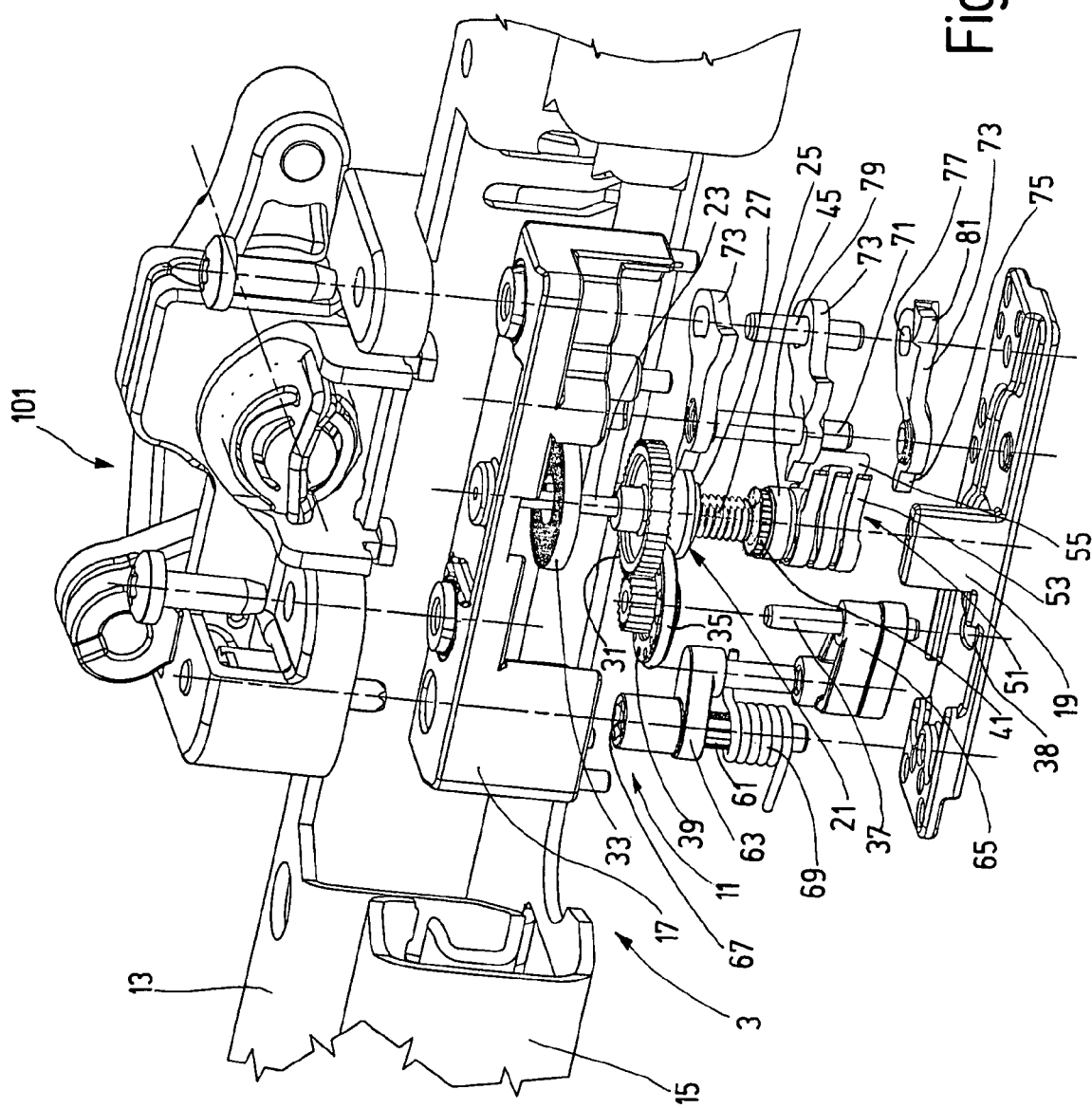
FIG. 1 is an exploded illustration of part of the exemplary embodiment, with the direction of travel pointing to the left.

A vehicle seat 1 for a two-door motor vehicle is longitudinally slidable in its entirety by means of a longitudinal adjuster 3, and can therefore assume various longitudinal seat positions. The backrest 5 of the vehicle seat 1 is mounted on the seat part 4 of the vehicle seat 1 so that the angle of inclination of the backrest 5 is adjustable and the backrest 5 is freely pivotable, i.e. can be folded forward, in order to permit access to the rear seats. In order to obtain the widest possible access, the longitudinal adjuster 3 is unlocked at the same time during the free pivoting movement of the backrest 5, so that the vehicle seat 1 can be slid forward. In order to return into the home position, the vehicle seat 1 is firstly slid back into the previously assumed longitudinal position of the seat where the longitudinal adjuster 3 is locked, and the backrest 5 is then pivoted back. A memory device 11 is provided for the storage of this previously assumed longitudinal position of the seat.

The memory device 11 largely corresponds in its design and its method of functioning to that which is described in WO 03/062012 A1 (which is a member of the same patent family as U.S. Pat. No. 6,799,800), the entire disclosure content of which is expressly incorporated herein by reference. The memory device 11 is arranged within an inner installation space in a first seat rail 13. The first seat rail 13 serves as one of two upper rails of the longitudinal adjuster 3. The first seat rail 13 is fixed to the seat structure and can be slid in the longitudinal direction of the vehicle seat 1 in relation to a second seat rail 15 that is fixed to the vehicle structure and serves as one of two lower rails of the longitudinal adjuster 3. The first seat rail 13 can be locked by means of a locking device 16. From this locking device 16, just one bolt projects upward out of the first seat rail 13 in FIG. 2.

The memory device 11 has a housing 17 with walls that are at least largely continuous in the upward and forward direction. The housing 17 is manufactured so as to be open in the downward direction and is closed by a screwed-on or riveted cover 19. That longitudinal side of two longitudinal sides of the housing 17 that is completely open is referred to below as the outwardly pointing side, whereas the longitudinal side which lies opposite is referred to as the inwardly pointing side. The memory device 11 has a measuring region, a control region and a load region.

A displacement measuring device 21 is provided in the measuring region. The displacement measuring device 21 has a bearing pin 23 that protrudes at the axial ends of the displacement measuring device 21. The bearing pin 23 defines an axial direction. By means of the bearing pin 23, the displacement measuring device 21 is mounted in the upper wall of the housing 17 or in the cover 19 so as to be rotatable about an axis of rotation defined by the bearing pin 23. The displacement measuring device 21, which is otherwise embodied in one piece, has, along the bearing pin 23 when viewed from below, a spindle 25. The spindle 25 is adjoined by a stop block 27 that has an annular recess. The stop block 27 has, in the region of its end side that points downward to the spindle 25, a first stop face 29. The first stop face 29 is arranged so as to extend radially outwards and perpendicularly to this end side that faces downward to the spindle 25 (i.e., with respect to the axial direction) and is embodied as a shoulder in the circumferential direction.

On the end side of the stop block 27 that points upward, there is an adjoining large gearwheel 31 that partially engages over the stop block 27 in the radial direction. On the end of the bearing pin 23 that protrudes beyond the large gearwheel 31, a reset spring 33 is mounted. The reset spring 33 is embodied in a helical shape. The inner end of the reset spring 33 is supported fixedly on the bearing axle 23. The outer end of the reset spring 33 is supported fixedly on the housing 17. As a further component of the measuring region, a running wheel 35 is rotatably mounted on a bearing axle 37 that is parallel to the bearing pin 23. The bearing axle 37 is guided at one end in the cover 19 in a bearing link 38 and at the other end in the housing 17 in an identically curved groove. A small gearwheel 39, which meshes with the large gearwheel 31, is fitted to, or integrally formed with, the upper end side of the gearwheel 35.

A control signal generator 41, which is embodied as a spindle nut, is screwed onto the spindle 25. Depending on the desired orientation of the memory device 11 with respect to the longitudinal direction of the vehicle seat 1, the threads of the spindle 25 and control signal generator 41 are right-handed or left-handed threads. The control signal generator 41 has, on its end side which points upward towards the stop block 27, a second stop face 43. The second stop face 43 is designed, with respect to its orientation, i.e. extending axially and radially, and with respect to its dimensions, for interaction with the first stop face 29. The external lateral face of the control signal generator 41 is provided with a toothing, for example a notched toothing. A bushing-shaped control bearing 45 is fitted on its inner lateral surface with a notched toothing that matches the notched toothing at the external lateral face of the control signal generator 41. By way of these matched teeth/toothings, the inner lateral surface of the control bearing 45 is fitted on the external lateral face of the control signal generator 41 so that the control bearing 45 is rotationally fixed and axially slidable in relation to the control signal generator 41. For clearly defined assembly it is possible for one or more teeth to be absent or for a tooth which has double the width or more to be provided.

The control bearing 45 has on its outside, in a first partial region, depressions that run in the circumferential direction and are offset with respect to one another. The control bearing 45 has on its outside, in a second partial region, a short elevation extending in the axial direction. The control bearing 45 has on its outside, in a third partial region, two depressions which run again in the circumferential direction and are offset with respect to one another. This design of the control bearing 45 serves to provide defined support and to entrain a control spring 51 in a rotationally fixed and axially nonslidable fashion. The control spring 51, which is punched out of spring sheet steel and is shaped relatively easily, substantially completely encloses the control bearing 45 in the circumferential direction. At the outwardly pointing side of the housing 17, the end of the control spring 51 is divided into three control tongues 53. The free ends of the three control tongues 53 protrude from the control bearing 45. The free ends of the control tongues 53 are short compared to the overall length, and they are otherwise arranged in the three depressions.

In the center region of the control spring 51, an axial cutout, which is short compared to the axial dimension, is provided for holding the elevation of the control bearing. The end 30 of the control spring 51 that points towards the inwardly pointing side of the housing 17 is composed of an individual supporting tongue 57 and a section which is closed in the shape of a bent clip, which is referred to below as control bracket 55. The control bracket 55 is seated in the two depressions. The supporting tongue 57 protrudes from the control bearing 45 in order to support the control bearing 45 and the control signal generator 41 on the housing 17.

In the control region, a control bolt 61 which is parallel to the bearing axle 37 and to the spindle 25 is rotatably mounted in the housing 17 and in the cover 19. A radially protruding switching lever 63, to which a running wheel lever 65 is connected in an articulated fashion, is integrally formed on the control bolt 61. The running wheel lever 65 is penetrated by the bearing axle 37. A contact pressure spring 69 is wound around the control bolt 61 and acts on the switching lever 63 in such a way that the running wheel 35 is pressed against the lower rail 15 by means of the running wheel lever 65. The control bolt 61 has at the front end which is mounted in the housing 17 a profiled control receptacle 67 which is accessible from the upper side of the memory device 11.

In the load region, three positioning levers, referred to below as locking elements 73, are mounted so as to be capable of pivoting one over the other on a bearing bolt 71. The bearing bolt 71 is parallel to the spindle 25 and mounted in the housing 17 and the cover 19. The three locking elements 73 each have, at their end pointing forward, a control finger 75 that bears on one side against a control tongue 53 and on the other side on the control bracket 55 of the control spring 51. At the opposite end pointing towards the rear, the locking elements 73 each have a guide link 77 which is curved about the bearing bolt 71. The guide links 77 receive a common guide bolt 79 which is arranged parallel to the bearing bolt 71 and is secured to the housing 17. Each locking element 73 has a locking nose 81 that points outwards towards the opened side wall of the memory device 11. In the process, the locking noses 81 of the individual locking elements are arranged at a different radial distance from the bearing bolt 71, with the locking nose 81 of the central locking element 73 being at the smallest radial distance, and the locking nose 81 of the lowest locking element 73 being at the largest radial distance. The control spring 51, which is supported by means of the supporting tongue 57, prestresses the positioning levers 73 inwards so that the locking noses 81 are normally arranged in the interior of the housing 17.

The memory device 11 and the locking device 16 are actuated by a common actuation device 101. The actuation device 101 is seated on the first seat rail 13 with restricted mobility in the longitudinal direction of the vehicle seat 1. The actuation device 101 is supported at its rear end on the first seat rail 13 by means of a compression spring 102 and a support clip 104. The support clip 104 is permanently connected to the first seat rail 13 proximate the actuation device 101 and has a box-shaped receptacle for the compression spring 102. The memory device 11 is attached to the actuation device 101 through suitable openings in the first seat rail 13, and can be actuated by means of the control bolt 61, while the actuation device 101 acts on the locking device 16 by means of a lever arrangement 106.

The actuation device 101 can be activated, on the one hand, for direct triggering of the longitudinal adjuster 3 by means of a longitudinal adjuster triggering lever 110 which protrudes from a horizontally arranged transverse tube 112 that is rotatably mounted on the triggering device 101 and is detachably connected to the lever arrangement 106. The longitudinal adjuster triggering lever 110 extends as far as the front end of the seat part 4 and is provided there with a handle which is accessible to the vehicle occupant. On the other hand, when the backrest 5 pivots freely the triggering device 101 can be activated by means of a backrest release lever 114, which is arranged on the outer side of the backrest 4, in order to indirectly trigger the longitudinal adjuster 3. In the process, the backrest release lever 114 acts by means of a Bowden cable 116 on the triggering device 101 in a way which is described in WO 03/062012 A1. On each side of the vehicle seat, the locking device 16 is composed essentially of a multi-tooth latching plate 118, which is connected to the bolt that projects out of the first seat rail 13, and a row of latches 120 (e.g., notches) that can be embodied as windows or spaces between teeth. With this locking device 16, which is known per se, the locking takes place in small increments of longitudinal position of the seats.

In the position of use of the vehicle seat 1, the longitudinal adjuster 3 is locked. Within the memory device 11, the control signal generator 41 is located at the upper end of the spindle 25 and rests with the second stop face 43 against the first face 29 of the stop block 27 of the displacement measuring device 21, but without the end sides of the control signal generator 41 and of the stop block 27 touching one another. The contact pressure spring 69 presses the running wheel 35 through an opening of the first rail 13 so that running wheel 35 abuts against the second seat rail 15. This longitudinal position which is set is referred to below as the remembered position.

When the backrest 5 pivots freely, among other components the longitudinal adjuster 3 is also released (e.g., unlocked) on both sides, i.e. in the respective locking device 16 the latching plate 118 is pressed out of the latches 120 (FIG. 7). Because of the tension in the Bowden cable 116 when the backrest 5 pivots forward, the actuation device 101, and the memory device 11 connected to it, are additionally pulled out of a home position and rearward in the longitudinal direction, as a result of which the compression spring 102 is stressed. Because of the small movement of the memory device 11, which corresponds to the arrival at (e.g., attainment of) the remembered position which is described below, the locking elements 73 firstly pivot out, but pivot in again (FIG. 8) as the movement begins in the forward direction. On both sides of the vehicle seat 1, the first seat rail 13 can then be slid forward relative to the second seat rail 15 in the longitudinal direction of the vehicle seat 1. Because of the relative displacement between the first seat rail 13 and the second seat rail 15, the running wheel 35 runs along the second seat rail 15 because of friction. As a result of the small gearwheel 39, the large gearwheel 31 is rotated so that the displacement measuring device 21 is driven. The control signal generator 41, which is secured in the circumferential direction by means of the control spring 51 and the control bearing 45, runs on the spindle 25 and moves in a downwardly guided linear fashion within the control bearing 45. The travel carried out by the vehicle seat 1 is directly related, by means of the transmission ratio between the two gearwheels 39 and 31 and the geometric dimensioning of the spindle 25, to the travel of the control signal generator 41 along the displacement measuring device 21. The length of the spindle 25 is correspondingly matched to the maximum displacement travel.

When the vehicle seat 1 is slid back, the control signal generator 41 moves again onto the stop block 27. As soon as the second stop face 43 moves into abutment against the first stop face 29, a control torque is generated which attempts to further rotate the control signal generator 41. The control spring 51, which presses with its control tongues 53 onto the control finger 75 of the latching elements 73, is acted on via the control bearing 45. The prestress of the control tongues 53 is active in a very effective way in this situation because of the lever arm which is defined by the short free end of the control tongue 53 projecting from the control bearing 45. The latching elements 73 thus pivot outwards, the pivoting movement of the latching element 73 being restricted by the relative movement of the guide link 77 and of the guide bolt 79. The locking noses 81 pass through windows (e.g., openings) in the upper rail 13. The locking nose 81 of at least one locking element 73 moves into a latch 120 (e.g., notch) on the second seat rail 15, so that the relative movement of the first seat rail 13 with respect to the second seat rail 15 is stopped by this lock (FIG. 9). The vehicle seat 1 has thus reached its remembered position again. In order for the locked locking element 73 to become released again, and in order to cope with cases in which the latching plate 118 is not precisely aligned with the latches 120 and must slide after the engagement, that is to say the locking device 16 can become unlocked only after a delay, the tension of the compression spring 102 is released as the backrest 5 pivots back, i.e. when the Bowden cable 116 is not under tension. The actuation device 101 is thus pushed forward into its home position. The locked locking element 73 comes free so that the control spring 51 can pivot all the locking elements 73 into the interior of the housing 17 again by means of the control brackets 55. In addition, the latching plate 118 can drop into the latches 120 (FIG. 10). The longitudinal adjuster 3 is locked so that the vehicle seat 1 is available again for use.

The remembered position can be reset, for example during normal longitudinal setting of the vehicle seat 1 or independently thereof, i.e. a reset of the memory device 11 can take place. For this purpose, the control bolt 61 is rotated, as a result of which the running rail 35 is lifted off from the second seat rail 15 by movement of the bearing axle 37, with the small gearwheel 39 remaining in engagement with the large gearwheel 31. The reset spring 33 drives the displacement measuring device 21 so that if the control signal generator 41 is not yet at the upper end of the spindle 25 the control signal generator 41 is rotated upwards until the stop faces 29 and 43 come into abutment, but the end sides of the control signal generator 41 and of the bearing block 27 do not. After the control bolt 61 has been released, the contact pressure spring 69 positions the running wheel 35 on the second seat rail 15 again and holds it without play. The new remembered position is thus stored.

It will be understood by those skilled in the art that while the present invention has been discussed above with reference to an exemplary embodiment, various additions, modifications and changes can be made thereto without departing from the spirit and scope of the invention as set forth in the following claims.

That which is claimed:

1. A longitudinal adjuster that is for a vehicle seat and is capable of being responsive to predetermined pivoting of a back rest of the vehicle seat, the longitudinal adjuster comprising:
    a first seat rail;
    a second seat rail, wherein the first and second seat rails are mounted so that the first seat rail can be moved longitudinally relative to the second seat rail;
    a memory device mounted for longitudinally moving with the first seat rail relative to the second seat rail, wherein the memory device interacts with the second seat rail for remembering a longitudinal position of the first seat rail with respect to the second seat rail so that the first seat rail can be longitudinally moved back to the remembered longitudinal position after the first seat rail has been longitudinally moved out of the remembered longitudinal position, wherein the first seat rail having been longitudinally moved out of the remembered longitudinal position is at least partially in response to the predetermined pivoting of the back rest of the vehicle seat, and wherein the memory device includes
    a displacement measuring device that is rotatable about a rotational axis and that can be brought into operative association with the second seat rail so that the displacement measuring device rotates about the rotational axis in response to the first seat rail being longitudinally moved relative to the second seat rail,
    a control spring,
    at least one locking element,
    a control signal generator mounted for moving relative to the displacement measuring device, with the moving of the control signal generator relative to the displacement measuring device corresponding to how far the first seat rail has longitudinally moved relative to the remembered longitudinal position, and the control signal generator experiences, at the latest when the first seat rail has been longitudinally moved back to the remembered longitudinal position, a control torque, and then actuates, by way of the control spring, the locking element so that the locking element interacts with the second seat rail, and
    a control bearing arranged between the control signal generator and the control spring, the control bearing guiding the control signal generator along the rotational axis of the displacement measuring device, and the control bearing supporting the control spring.

2. The longitudinal adjuster as claimed in claim 1, wherein the control bearing encloses the control signal generator.

3. The longitudinal adjuster as claimed in claim 2, wherein:
    the displacement measuring device includes a threaded spindle that rotates about the rotational axis, and
    the control signal generator comprises a spindle nut that runs on the spindle and along the rotational axis in response to rotation of the spindle about the rotational axis.

4. The longitudinal adjuster as claimed in claim 2, wherein the control bearing supports the control spring in a rotationally fixed manner by way of depressions and/or elevations.

5. The longitudinal adjuster as claimed in claim 2, wherein the control spring substantially surrounds the control bearing.

6. The longitudinal adjuster as claimed in one of claim 2, wherein:
    the control spring has at least one control tongue having a length that is shorter than an overall length of the control spring; and
    a free end of the control tongue protrudes from the control bearing.

7. The longitudinal adjuster as claimed in claim 2, further comprising:
    a locking device for locking the longitudinal adjuster and thereby restricting the first seat rail from longitudinally moving relative to the second seat rail; and
    an actuation device mounted for longitudinally moving with the first seat rail relative to the second seat rail, wherein the actuation device is for actuating
        (a) resetting of the memory device's remembered longitudinal position, and
        (b) unlocking of the locking device.

8. The longitudinal adjuster as claimed in claim 1, wherein the control signal generator is seated in the control bearing by way of toothing, so that the control signal generator is:
    rotationally fixed with respect to the control bearing, and
    slidable along the rotational axis relative to the control bearing.

9. The longitudinal adjuster as claimed in claim 8, wherein:
    the displacement measuring device includes a threaded spindle that rotates about the rotational axis, and
    the control signal generator comprises a spindle nut that runs on the spindle and along the rotational axis in response to rotation of the spindle about the rotational axis.

10. The longitudinal adjuster as claimed in claim 8, wherein the control bearing supports the control spring in a rotationally fixed manner by way of depression and/or elevations.

11. The longitudinal adjuster as claimed in claim 8, wherein the control spring substantially surrounds the control bearing.

12. The longitudinal adjuster as claimed in one of claim 1, wherein:
    the displacement measuring device includes a threaded spindle that rotates about the rotational axis, and
    the control signal generator comprises a spindle nut that runs on the spindle and along the rotational axis in response to rotation of the spindle about the rotational axis.

13. The longitudinal adjuster as claimed in claim 1, wherein the control bearing supports the control spring in a rotationally fixed manner by way of depressions and/or elevations.

14. The longitudinal adjuster as claimed in claim 1, wherein the control spring substantially surrounds the control bearing.

15. The longitudinal adjuster as claimed in one of claim 1, wherein:
   the control spring has at least one control tongue having a length that is shorter than an overall length of the control spring; and
   a free end of the control tongue protrudes from the control bearing.

16. The longitudinal adjuster as claimed in claim 1, further comprising a locking device for locking the longitudinal adjuster and thereby restricting the first seat rail from longitudinally moving relative to the second seat rail.

17. The longitudinal adjuster as in claim 16, further comprising an actuation device mounted for longitudinally moving with the first seat rail relative to the second seat rail, wherein the actuation device is for actuating:
   resetting of the memory device's remembered longitudinal position, and
   unlocking of the locking device.

18. The longitudinal adjuster as claimed in claim 1 in combination with the vehicle seat having the backrest.

19. A longitudinal adjuster that is for a vehicle seat and is capable of being responsive to predetermined pivoting of a back rest of the vehicle seat, the longitudinal adjuster comprising:
   a first seat rail;
   a second seat rail, wherein the first and second seat rails are mounted so that the first seat rail can be moved longitudinally relative to the second seat rail;
   a memory device mounted for longitudinally moving with the first seat rail relative to the second seat rail, wherein the memory device interacts with the second seat rail for remembering a longitudinal position of the first seat rail with respect to the second seat rail so that the first seat rail can be longitudinally moved back to the remembered longitudinal position after the first seat rail has been longitudinally moved out of the remembered longitudinal position, wherein the first seat rail having been longitudinally moved out of the remembered longitudinal position is at least partially in response to the predetermined pivoting of the back rest of the vehicle seat, and wherein the memory device includes
   a displacement measuring device that is rotatable about a rotational axis and that can be brought into operative association with the second seat rail so that the displacement measuring device rotates about the rotational axis in response to the first seat rail being longitudinally moved relative to the second seat rail,
   a control spring,
   at least one locking element,
   a control signal generator mounted for moving relative to the displacement measuring device, with the moving of the control signal generator relative to the displacement measuring device corresponding to how far the first seat rail has longitudinally moved relative to the remembered longitudinal position, and the control signal generator experiences, at the latest when the first seat rail has been longitudinally moved back to the remembered longitudinal position, a control torque, and then actuates, by way of the control spring, the locking element so that the locking element interacts with the second seat rail, and
   a control bearing arranged between the control signal generator and the control spring, with the control bearing guiding the control signal generator and supporting the control spring, wherein the control bearing encloses the control signal generator.

20. A longitudinal adjuster that is for a vehicle seat and is capable of being responsive to predetermined pivoting of a back rest of the vehicle seat, the longitudinal adjuster comprising:
   a first seat rail;
   a second seat rail, wherein the first and second seat rails are mounted so that the first seat rail can be moved longitudinally relative to the second seat rail;
   a memory device mounted for longitudinally moving with the first seat rail relative to the second seat rail, wherein the memory device interacts with the second seat rail for remembering a longitudinal position of the first seat rail with respect to the second seat rail so that the first seat rail can be longitudinally moved back to the remembered longitudinal position after the first seat rail has been longitudinally moved out of the remembered longitudinal position, wherein the first seat rail having been longitudinally moved out of the remembered longitudinal position is at least partially in response to the predetermined pivoting of the back rest of the vehicle seat, and wherein the memory device includes
   a displacement measuring device that is rotatable about a rotational axis and that can be brought into operative association with the second seat rail so that the displacement measuring device rotates about the rotational axis in response to the first seat rail being longitudinally moved relative to the second seat rail,
   a control spring,
   at least one locking element,
   a control signal generator mounted for moving relative to the displacement measuring device, with the moving of the control signal generator relative to the displacement measuring device corresponding to how far the first seat rail has longitudinally moved relative to the remembered longitudinal position, and the control signal generator experiences, at the latest when the first seat rail has been longitudinally moved back to the remembered longitudinal position, a control torque, and then actuates, by way of the control spring, the locking element so that the locking element interacts with the second seat rail, and
   a control bearing arranged between the control signal generator and the control spring, the control bearing guiding the control signal generator, and the control bearing supporting the control spring in a rotationally fixed manner by way of depressions and/or elevations.

* * * * *